United States Patent Office 3,346,546
Patented Oct. 10, 1967

3,346,546
HIGH ENERGY PROPELLANT BINDERS
Leland K. Beach, Westfield, John Brooke Gardiner, Mountainside, and Richard P. Rhodes, Newark, N.J., assignors to Esso Research and Engineering Company, a corporation of Delaware
No Drawing. Filed Dec. 21, 1960, Ser. No. 77,466
11 Claims. (Cl. 260—94.7)

This invention relates to a high energy binder made from unsaturated carbon chain polymers modified by functional groups which make the polymers curable by cross-linking of the functional groups or by treatment with a cross-linking agent that reacts with said groups, said polymers being reacted with tetrafluorohydrazine, $N_2F_4$, to give them high oxidizing ability as when used in a rocket propellant composition, partly of the solid type.

Binders are employed in propellant compositions to impart strength or toughness and rigidity. The drawback of low energy binders, e.g., natural rubber, synthetic hydrocarbon polymers, and polymers containing oxygen or a halogen, is that such binders lower the available energy of the compositions. The low energy binders have relatively little fuel value and little or no oxidizing properties and yet add weight to the compositions. The present invention is concerned with providing needed high energy binders that can be conveniently mixed in a liquid or semi-liquid phase with other propellant ingredients and then be cured to form a solid composite after casting, molding, extruding or other methods of shaping the propellant charge.

Polybutadiene which is a typical low energy binder can be reacted with $N_2F_4$ to form a high energy polymeric material containing a high proportion of $CNF_2$ groups, but material of this type has been found to lack desirable physical properties in being brittle, insoluble and difficult to mix with other solid propellant ingredients. Such material also has limitations on curability, i.e., hardening or toughening the propellant formulation.

In accordance with the present invention, it has been found that unsaturated carbon chain polymers, such as butadiene, allene or acetylene polymers of copolymers, after being reacted to contain functional groups, e.g. maleic anhydride, do not have any serious interference by the functional groups with the addition of $N_2F_4$ to double bonds in the carbon chain. The polymers modified by the functional groups and with the added $N_2F_4$ are suitable in physical characteristics, e.g., flowability or softness and mixing with high energy propellant ingredients, such as powdered metals, oxidizers, etc. The mixture of the thus modified high energy polymer binders are then capable of being cured through crosslinking reaction.

The unsaturated polymers that may be used as a starting material for making the high energy binders are those having a carbon chain or carbon-carbon backbone with a number of double bonds in this chain giving the polymers an iodine number of preferably at least 200 to 400. Among such unsaturated polymers are natural rubber, resins formed from a hydrocarbon mixture that contains diolefins with varying amounts of olefins and aromatics, conjugated or unconjugated $C_4$ to $C_6$ diolefins, such as butadiene-1,3, isoprene, chloroprene, pentadiene-1,4, hexadiene-1,5 and mixtures of such diolefins one with another or with monoolefins, e.g. ethylene, propylene, isobutylene, or with more unsaturated compounds, e.g., allene or acetylenes such as divinyl acetylene, or with aromatic compounds such as styrene. Suitable and available polymers and copolymers include cis-1,4-polybutadiene rubber, trans-1,4-polybutadiene rubber, mixed 1,2 and 1,4-polybutadiene rubber, polychloroprene rubber and cis or trans 1,4-polyisoprenes. The unsaturated polymers may have a viscosity average molecular weight as low as 500 or as high as 2 million or more. The preferred polymers have the high unsaturation of hydrocarbon rubbers such as polybutadienes or copolymers of a major proportion of diolefins with less unsaturated monomers and which have molecular weights of about 1000 to 100,000 or higher.

Since many of the polymers are viscous oils, semisolids or solids, it is generally necessary to dissolve such polymers in a suitable inert solvent to promote the reaction of the polymers with the modifying agent to facilitate handling and mixing the modifying agent or reactant being a substance which incorporates a functional group, e.g., maleic anhydride, fumaric and maleic acids, fumaramides, maleamides, fumaryl chloride, acrylic acid, alkyl or vinyl isocyanate, and maleic half acid esters. Polymers may also be epoxidized. Methods of using the modifying agents for introducing the functional groups are similar to those described in U.S. Patent 2,672,425 of A. H. Gleason et al., U.S. Patent 2,652,342 of A. H. Gleason and U.S. Patent 2,842,513 of W. P. Fitzgerald et al. For the purposes of the present invention, such methods of adding or linking a functional group to the polymers or other methods are used with steps and precautions to avoid saturation of too many of the double bonds and avoid oxidation.

The unsaturated polymers having a functional group incorporated therein may then be treated with $N_2F_4$. The treatment with $N_2F_4$ may be carried out on the modified polymer remaining in the inert solvent.

Examples of solvents which can be used for the reaction with the modifying agents that introduce functional groups are paraffinic and aromatic naphtha hydrocarbons, such as benzene, toluene, xylene, n-hexane, n-heptane, $C_1$ to $C_6$ halogenated hydrocarbons, e.g. chloroform, carbon tetrachloride and nitro compounds, such as nitrobenzene and nitromethane. The solvent preferably should be free of water. The amount of solvent depends on the amount of reduction in viscosity and the solubility of the polymer.

The reaction of $N_2F_4$ with the unsaturated polymer which is modified to contain a functional group, may be effected in any suitable vessel such as a stainless steel bomb or autoclave or in a continuous or cascade type of reactor. Excesses of $N_2F_4$ supplied for the reaction may be recovered in a trap maintained at sufficiently low temperature to condense the $N_2F_4$ gas. The recovered liquefied gas can be recycled to the reaction zone. In this reaction with $N_2F_4$, an adduct of the $N_2F_4$ is formed, carbons having double bonds in the chain becoming linked to $NF_2$ groups. The $N_2F_4$ adducts of the modified unsaturated polymers may be completely soluble in the solvent or may tend to precipitate during the reaction and in the latter case may then be recovered by filtration and washing.

If the modified polymer partly remains dissolved in the solvent, the solvent may be flashed, vaporized or distilled from the product. To facilitate separation of soluble polymer from solvent, a low boiling inert solvent, e.g. boiling below 150° C., is used. In some instances, the dissolved modified polymer adduct of $N_2F_4$ in the reaction mixture may be recovered by adding a non-solvent such as a low molecular weight alcohol to the mixture to precipitate the product.

Ionizing radiation can be used to promote reaction of the $N_2F_4$ with the polymer that is linked to a functional group, especially if low reaction temperatures are to be employed. For this purpose the radiation doses are from 0.1 to 30 megaroentgens. The dose rate may vary from 10,000 to as high as 500,000 roentgens per hour. Among types of radiation that are suitable are high energy electromagnetic radiations, such as gamma rays and X-rays. In general, high velocity electrons, high energy gamma rays and neutrons are useful on account of their high penetrating power and availability. High energy ionizing radiation is radiation that gives a dose rate of at least $1 \times 10^4$ R per hour which excludes low energy radiation such as ultra-violet light. Radioactive cobalt 60 is a suitable source of gamma rays used as ionizing radiation.

In the preferred embodiment, a low molecular weight polymer having high unsaturation, such as polybutadiene modified to contain a small amount of functional groups is reacted with $N_2F_4$ without the need of radiation ionization. The modified polybutadiene is dissolved in a suitable inert solvent, such as benzene, $CHCl_3$, $CH_3CN$ and the solution is introduced into a vessel capable of withstanding pressures of at least 1000 p.s.i. The vessel is cooled with liquid nitrogen and air is removed from the vessel by vacuum pump. About 2 to 10 mols of $N_2F_4$ per double bond in the polymer is introduced into the reaction vessel which is warmed to about 25 to 100° C. The pressure of $N_2F_4$ in the vessel is then maintained at approximately 150 to 600 p.s.i.a., the bomb is shaken or vibrated or internally mixed to agitate the reaction for about 1 to 20 hours and thereafter the unreacted $N_2F_4$ is released from the bomb and recovered. The $N_2F_4$-polymer adduct is then recovered as mentioned.

The preferred method of making the crosslinkable binder is to react an epoxidized or grafted polymer in benzene and acetonitrile with $N_2F_4$ under agitation and heat to give a soluble gum. The method of using benzene or other hydrocarbon or halocarbon only as the reaction solvent yields insoluble products as mentioned below.

EXAMPLE 1

10,000 molecular weight polybutadiene (68% 1,2-32% 1,4) in benzene is reacted under pressure at 80° C. for 3 hours with 1% maleic anhydride. This material is then treated in 79% benzene, 21% acetonitrile solvent at 9% concentration with 430 p.s.i. gauge $N_2F_4$ and heated at 80° C. for 3 hours with shaking. The resultant product is over 95% soluble in acetonitrile, contains 53.5% $N_2F_4$, and is 64% saturated.

EXAMPLE 2

In a similar manner, an epoxidized polybutadiene of about 15,000 mol weight with .75% oxirane oxygen is dissolved in 79% benzene, 21% acetonitrile to an 11.67% concentration. The solution is treated with 430 p.s.i. gauge $N_2F_4$ for 4.5 hours at 80° C. to give a completely soluble product containing 62.7% $N_2F_4$.

EXAMPLE 3

A polybutadiene linked with 1% maleic anhydride is dissolved in benzene to form a 19% solution and then treated with 430 p.s.i.g. $N_2F_4$ for 60° C. at 16 hours with no agitation to give a 32.5% soluble yellow gum with 44.4% $N_2F_4$ content or about 47% saturation of the double bonds. This result contrasts with the improved result obtained in Example 1 by the use of a superior solvent system.

To prevent premature cross-linking of the modified polymer adduct, it is desirable to remove trace quantities of $N_2F_4$ at the end of the reaction. The removal can be effected by use of vacuum. It can also be effected by addition of a small amount of a highly unsaturated material, such 1,3,5-hexatriene. This highly unsaturated material reacts with the trace amounts of $N_2F_4$ and the adduct can then be separated and recovered from the solution along with any unreacted hexatriene. The hexatriene adduct with the trace amounts of $N_2F_4$ can be treated separately to form a low molecular weight hydrocarbon adduct of $N_2F_4$ which is useful as a plasticizer of the polymer adduct.

The following examples are given of the method demonstrating the preparation and use of the modified polymer —$N_2F_4$ adducts.

EXAMPLE 4

A modified polymer containing a cross-linking functional group was made by reacting 10,000 molecular weight polybutadiene with 1% maleic anhydride in benzene as a solvent by heating under pressure to a temperature of 80° C. for 3 hours. The maleic anhydride is indicated to become affixed to non-double bonded carbon atoms in the polymer chain thus linking to the chain a maleic anhydride function without using up unsaturation. The thus modified unsaturated polymer was dissolved (16.5%) in benzene and was treated with $N_2F_4$ under 430 pounds per square inch gauge pressure at 60° C. for 16 hours with no agitation. The product was an amber gum 33% soluble in benzene and in $CH_3NO_2$. The soluble portion was reacted with a small amount of ethylene glycol. The result was a deflagratable tough resin insoluble in benzene and chloroform but soluble in acetone. The $NF_2$ content of the $N_2F_4$-polymer adduct was found to be 48.8% by $N_2F_4$ material balance and 48.8% by fluorine analysis.

EXAMPLE 5

Polybutadiene of 2000 molecular weight prepared by sodium polymerization was dissolved in n-hexane solvent to make a 5% solution. The solution was mixed with peracetic acid solution in a molar proportion of 2 to 1. The mixture was stirred vigorously for 24 hours at 25° C. to form epoxidized polybutadiene containing about 9% oxygen. The epoxidized polybutadiene was taken up in dioxane and was recovered by distilling off the dioxane. The epoxidized polybutadiene 9.95% in benzene was then treated with $N_2F_4$ at 400 p.s.i.g. for 17 hours at 80° C. with no agitation, to obtain at least 34.7% $N_2F_4$ in the product which was insoluble. This is in contrast to the soluble product formed in Example 2 using a superior solvent system.

EXAMPLE 6

Polybutadiene was carboxylated by reacting butadiene and a carboxylated monomer such as acrylic acid or maleic or fumaric acid. The carboxylated polybutadiene was dissolved in benzene to give a 9% solution and then reacted with $N_2F_4$ (430 p.s.i.g.) for 3½ hours at 80° C. with shaking so that 60% of the double bonds were saturated by the $N_2F_4$ in forming the 54.6% ($N_2F_4$ material balance) $N_2F_4$ adduct which was 34.4% soluble in $CH_3NO_2$.

EXAMPLE 7

Polybutadiene with 1% grafted maleic anhydride was disolved in benzene (16.5%) and treated with 400 p.s.i.g. of $N_2F_4$ for 4 hours at 72.5° C. with agitation to give an insoluble sensitive solid with 48.5% $N_2F_4$.

The results obtained in adding the functional groups to the unsaturated polymer indicated that the functional groups do not interfere with the addition of the $N_2F_4$ to the double bonds.

The unsaturated polymers to be linked to a functional group and treated with $N_2F_4$ to form the adduct with $N_2F_4$ contain a large number of C=C groups. The functional groups may be those which are crosslinked by any number of crosslinking reactants, such as glycols when the functional group is an acid group to cure and give the polymer toughness.

The epoxidized polybutadiene adduct of $N_2F_4$ may be mixed with the $N_2F_4$ reacted polybutadiene having acid functional groups and such a mixture then cured to give a crosslinked polymer. One example would be the use of the epoxidized polybutadiene adduct of $N_2F_4$ containing epoxy groups together with the $N_2F_4$ adduct of a polybutadiene polymer containing anhydride or acid groups derived from maleic acid or anhydride. The use of such a combination in a propellant formation allows such polymers to cure by reacting with each other.

The maleic anhydride polybutadiene adduct of $N_2F_4$ reacts satisfactorily with penta-erythritol to give a firm rubber.

The thus curable high energy binders can be made to contain a minimum required amount of the functional groups e.g. about one functional unit per hundred double bonds, more or less; thus the functional groups do not seriously lower the amount of $N_2F_4$ that can be added and add very little low fuel value constituents to the binders. The high energy curable polymers can be compounded with high energy plasticizers, such as difluoramino alkanes and difluoramino cyclic ethers, such as contain about 1 $NF_2$ group per carbon. They may also be mixed with compatible oxidizers, such as tetranitromethane, hexanitroethane, ammonium perchlorate, nitronium perchlorate, powdered propellant metals, e.g. lithium, boron, beryllium, or aluminum to produce solid propellant having specific impulses in the range of 270 to 300.

A typical formulation for a solid propellant meeting the needs of a rocket is as follows:

| Ingredients: | Weight Percent |
|---|---|
| Tetrakis difluoramino butane | 29.9 |
| Hexanitroethane | 34.1 |
| Boron | 6.0 |
| Modified polybutadiene-$N_2F_4$ adduct | 30.0 |

The ingredients set forth are mixed to obtain a viscous mixture, which after pouring into a mold or a rocket chamber, is cured by moderate heating to a temperature from room temperature to 90° C. for from 1 to 16 hours.

Aside from using the modified polymers containing a functional group and having double bonds saturated by $N_2F_4$ as binders, they may also be used as detonating agents and explosives. These high energy binders curable through the functional groups have been found to have specific impulse values in the range of 235 to 280, and when used as binders with suitable powdered metal fuels, e.g. boron and suitable oxidizing agents, e.g. hexanitroethane with high energy plasticizer, overall specific impulse values in the range of 255 to 295 are obtained.

What is claimed is:

1. A modified unsaturated carbon chain polymer containing an $NF_2$ group linked to each of a number of carbon atoms in said chain, and linked to carbon atoms in said chain a cross-linking function selected from the group consisting of carboxy acid, amide, oxyhalide, epoxide, acid ester, isocyanate and acid anhydride, the thus linked $NF_2$ groups giving the modified polymer an $N_2F_4$ content in the range of 34.7 to 62.7 wt. percent.

2. A modified polybutadiene having an $NF_2$ group linked to each of a number of carbon atoms in its carbon chain nucleus and a maleic anhydride group as a cross-linking functional group linked to said carbon chain nucleus, the thus linked $NF_2$ groups giving the modified polymer an $N_2F_4$ content in the range of 34.7 to 62.7 wt. percent.

3. A modified polybutadiene having an $NF_2$ group linked to each of a number of carbon atoms in its carbon chain nucleus and having an epoxide oxygen atom as a cross-linking function linked to said carbon chain nucleus, said modified polybutadiene containing from 34.7 to about 62.7 wt. percent $N_2F_4$.

4. A modified polybutadiene adduct of $N_2F_4$ containing from 34.7 to 62.7 wt. percent $N_2F_4$ and having a carboxyl functional group of acrylic acid attached to the carbon chain nucleus of the polybutadiene.

5. Cross-linked modified unsaturated carbon chain polymers containing an $NF_2$ group linked to each of a number of carbon atoms in the chains of the polymers, said polymers having a carboxy acid functional group attached to carbon atoms in the chains reacted with a dihydric alcohol, the modified polymers containing from 34.7 to about 62.7 wt. percent $N_2F_4$.

6. Modified polybutadiene molecules containing an $NF_2$ group linked to each of a number of carbon atoms in the carbon chain nucleus of polybutadiene and having a maleic anhydride function attached to carbon atoms in the chain nucleus of the molecules cross-linked through a reacted dihydric alcohol, said modified polybutadiene molecules containing from 34.7 to about 62.7 wt. percent $N_2F_4$.

7. Cross-linked modified polybutadiene containing an $NF_2$ group linked to each of a number of carbon atoms in the carbon chain of said molecules, which are cross-linked through the reaction of an epoxy function to a portion of said molecules and a carboxy acid function attached to another portion of said molecules, the $NF_2$ groups in said modified polybutadiene molecules giving them an $N_2F_4$ content in the range of 32.7 to 62.7 wt. percent.

8. Process of preparing a high-energy polymeric binder which comprises modifying an unsaturated carbon chain polymer by reacting said polymer with a reactant selected from the group consisting of maleic anhydride, fumaric acid, maleic acid, peracetic acid, acrylic acid, fumaryl chloride, fumaramide, maleamide, vinyl isocyanate, and maleic half acid ester to add a cross-linking functional group of said reactant to the unsaturated carbon chain polymer, and reacting the thus modified polymer with $N_2F_4$ to form an adduct thereof containing an $NF_2$ group cross-linked to each of a number of carbon atoms in the carbon chain so as to gve the modified polymer an $N_2F_4$ content in the range of 34.7 to about 62.7 wt. percent.

9. The process as defined in claim 8, wherein the polymer having a cross-linking functional group is reacted in a solvating liquid with $N_2F_4$ to form the adduct.

10. Process of claim 8 in which excess unreacted $N_2F_4$ is reacted with hexatriene introduced following formation of the adduct.

11. Process of claim 8 in which polybutadiene is the polymer modified to contain a cross-linking functional group and reacted with $N_2F_4$ to form the adduct containing the $NF_2$ groups, after which the thus modified polybutadiene is cross-linked through a reaction of the functional group.

References Cited

UNITED STATES PATENTS

| 2,582,693 | 1/1952 | Gleason | 260—94.2 |
| 2,612,493 | 9/1952 | Sparks et al. | 260—94.2 |
| 2,929,697 | 3/1960 | Perry et al. | 52—0.5 |
| 2,974,026 | 3/1961 | Batchelder | 52—0.5 |

JOSEPH L. SCHOFER, *Primary Examiner.*

LEON D. ROSDOL, *Examiner.*

B. R. PADGETT, W. F. HAMROCK,
*Assistant Examiners.*